United States Patent
Wieth et al.

(10) Patent No.: US 11,496,615 B2
(45) Date of Patent: Nov. 8, 2022

(54) UNIVERSAL BRACKET FOR A TELECOMMUNICATION TERMINAL

(71) Applicants: Franz Wieth, Puchheim (DE); Andreas Filosi, Puchheim (DE)

(72) Inventors: Franz Wieth, Puchheim (DE); Andreas Filosi, Puchheim (DE)

(*) Notice: Subject to any disclaimer, the term of this patent is extended or adjusted under 35 U.S.C. 154(b) by 206 days.

(21) Appl. No.: 16/965,175

(22) PCT Filed: Jan. 29, 2019

(86) PCT No.: PCT/EP2019/052119
§ 371 (c)(1),
(2) Date: Nov. 6, 2020

(87) PCT Pub. No.: WO2019/145564
PCT Pub. Date: Aug. 1, 2019

(65) Prior Publication Data
US 2021/0058504 A1 Feb. 25, 2021

(30) Foreign Application Priority Data
Jan. 29, 2018 (DE) .............................. 102018000658

(51) Int. Cl.
*H04M 1/04* (2006.01)
(52) U.S. Cl.
CPC .................................... *H04M 1/04* (2013.01)
(58) Field of Classification Search
CPC ........... H04M 1/04; B60R 11/02; F16M 11/04
See application file for complete search history.

(56) References Cited

U.S. PATENT DOCUMENTS

| 8,474,832 B2 * | 7/2013 | Mersky ................. F16M 13/02 |
| | | 280/33.991 |
| 9,609,105 B1 | 3/2017 | Krug et al. |
| 9,699,285 B1 | 7/2017 | Lundsgaard et al. |
| 9,825,664 B2 | 11/2017 | Wieth |
| 10,210,503 B2 | 2/2019 | Sonnendorfer et al. |
| 10,587,739 B2 | 3/2020 | Ormsbee et al. |

(Continued)

FOREIGN PATENT DOCUMENTS

| DE | 202004006834 U1 | 7/2004 |
| DE | 202011051891 U1 | 11/2011 |

(Continued)

*Primary Examiner* — Tuan D Nguyen
(74) *Attorney, Agent, or Firm* — Laurence A. Greenberg; Werner H. Stemer; Ralph E. Locher (57) ABSTRACT

A bracket for a telecommunication terminal has a first jaw formed with a first receptacle for a first edge side of the telecommunication terminal and a second jaw with a second receptacle for a second edge side, opposite the first edge side, of the telecommunication terminal. The first and second receptacles, in an initial position of the bracket, form one side of a V-shaped insertion opening. At least one of the jaws is mounted rotatably on a housing of the bracket. The receptacle of the rotatably mounted jaw has a first section in front of the axis of rotation of the jaw in the direction of insertion of the telecommunication terminal and a second section arranged behind the axis of rotation of the jaw in the direction of insertion. The rotatably mounted jaw is rotatable counter to the restoring force of a first spring element.

16 Claims, 4 Drawing Sheets

(56) References Cited

U.S. PATENT DOCUMENTS

2012/0161406 A1* 6/2012 Mersky ................ B62B 3/1428
                                                         248/274.1
2014/0265185 A1* 9/2014 Mersky ................ B62B 3/1428
                                                         248/580

FOREIGN PATENT DOCUMENTS

| NO | 20093230 A1 | 4/2011 |
| RU | 58828 U1 | 11/2006 |
| RU | 2606237 C2 | 1/2017 |
| WO | 2015055851 A1 | 4/2015 |
| WO | 2017184517 A1 | 10/2017 |

* cited by examiner

UNIVERSAL BRACKET FOR A TELECOMMUNICATION TERMINAL

BACKGROUND OF THE INVENTION

Field of the Invention

The invention relates to a bracket for a telecommunication terminal, wherein the bracket has two jaws, wherein the first jaw comprises a first receptacle for a first edge side of the telecommunication terminal, and a second jaw comprises a second receptacle for a second edge side of the telecommunication terminal lying opposite the first edge side. The invention further relates to a method for inserting a telecommunication terminal into a bracket according to the invention.

Brackets for telecommunication terminals, for example smartphones, are offered in several embodiments. In general, they are used for being able to mount and operate the smartphone held by them without it having to be handheld in the process. For example, DE 20 2011 051 891 U1 shows a holding device for a mobile phone with two retaining pawls fastened to a guide rail, which non-positively hold the mobile phone arranged between them, in that they are guided from both sides against the side edges of the mobile phone and latched in this position.

Known from WO 2015/055851 is a smartphone bracket whose receptacle space completely envelops the smartphone along its edge sides. The receptacle space is shortened by inserting a U-shaped strap into the base body of the bracket, thereby fixing in place the smartphone lying therein.

The disadvantage to these solutions is that at least two steps are always required for securely holding the smartphone in the bracket. The smartphone is first to be placed in the bracket, after which the latter is closed.

SUMMARY OF THE INVENTION

The object of the invention is to propose a bracket for a telecommunication terminal that is easier to operate.

This object is achieved by the bracket for a telecommunication terminal with the features as claimed, and by the method for inserting a telecommunication terminal into a bracket as claimed.

One essential underlying idea of the invention is that the first and the second receptacle each form one side of an at least essentially V-shaped insertion opening for the telecommunication terminal in an initial position of the bracket, that at least one of the jaws be rotatably mounted to a housing of the bracket, that the receptacle of the rotatably mounted jaw have two sections, wherein the first section is arranged in front of the axis of rotation of the jaw in the direction of insertion of the telecommunication terminal, and the second section is arranged behind the axis of rotation of the jaw in the direction of insertion of the telecommunication terminal, wherein the rotatably mounted jaw is rotatable against the restoring force of a first spring element.

The method according to the invention for inserting the telecommunication terminal into a bracket is characterized in that the bracket comprises two jaws, wherein each jaw has a receptacle for an edge side of the telecommunication terminal, wherein each receptacle forms a side of an at least essentially V-shaped insertion opening in an initial position of the bracket, wherein the telecommunication terminal is inserted into the insertion opening in a first step, so that opposing edge sides of the telecommunication terminal come to abut against a respective one of the receptacles, wherein additionally inserting the telecommunication terminal along a first section of the two receptacles displaces at least one of the jaws transverse to the direction of insertion, and that the opposing edge sides are inserted into a second section of the two receptacles in a second step, wherein the latter are arranged parallel to each other once the second sections have been reached.

Such a bracket or such a method makes it possible to achieve a non-positive retention of the telecommunication terminal in the bracket already by introducing the telecommunication terminal into the insertion opening. A separate step for mounting the telecommunication terminal in the bracket is no longer required.

In a preferred embodiment, both jaws are rotatably mounted to the housing of the bracket. As a result, they are able to facilitate the insertion of the telecommunication terminal via opposite respective movements. However, it is entirely sufficient in a basic form of the invention that only one of the jaws be rotatably mounted to the housing of the bracket, while the other jaw is fixedly connected with the housing. In this basic form, only the rotatable jaw performs the movement required to enable an insertion of the telecommunication terminal. The invention will be described below based upon the preferred embodiment, in which both jaws are rotatable. However, this always includes the embodiment with only a single movable jaw.

The function of a bracket according to the invention will be described in the following proceeding from the initial position of the bracket. The initial position is the position in which the receptacles of the jaws are empty, i.e., not acted upon by any insertion of the terminal. In this position, the jaws are held together by the restoring force of the first spring element. A continued compression of the jaws beyond the initial position is here limited by a stop for the jaws formed on the housing, or by having the two jaws bump against each other in the initial position. Inserting a telecommunication terminal into the at least essentially V-shaped insertion opening leads to a positional change in the rotatably mounted jaw to a receiving position. This is the position in which the telecommunication terminal is non-positively held between the second sections of the receptacles of the two jaws.

While inserting the telecommunication terminal into the at least essentially V-shaped insertion opening, the position of the terminal is centrally guided along the progression of the first section of the first and second receptacles and into the insertion opening, and there quasi-centered. As soon as the terminal has been inserted to a point where its side edge guided into the receptacle has reached a position in which it is arranged between the axes of rotation of the jaws, continuing to insert the terminals causes the side edge to exert a pressure on the second section of the receptacle. This leads to a rotation by the jaws against the restoring force of the first spring element. The rotation pulls the two sections of the brackets away from each other, spreading them apart, as it were. The rotation ends in a position in which the two second sections are no longer V-shaped, but rather aligned parallel to each other. The telecommunication terminal can now be introduced into the space opened up by spreading apart the second sections. It is there non-positively held by the restoring force of the first spring element.

It is here especially advantageous if the end of the receptacle opposite the insertion opening have a blockade element, in particular one designed transverse to the insertion opening, which borders the receptacle and prevents the side edges of the telecommunication terminal from advancing. Without the blockade element, it would be possible to push the side edges of the telecommunication terminal out of the receptacle again at its end.

In order to remove the telecommunication terminal from the bracket, the steps described above are performed in the opposite sequence. The telecommunication terminal non-positively held between the two sections is moved in the direction of the two first sections of the receptacles. As soon as the side edges of the telecommunication terminal have been pushed out of the second sections again, the restoring force of the spring element acting on the jaws causes them to rotate back into the initial position. The telecommunication terminal can then be easily removed from the insertion opening.

It is here advantageous that the axis of rotation of the rotatably mounted jaw be movable at least approximately transverse to the direction of insertion of the telecommunication terminal and against the restoring force of a second spring element. This especially preferred embodiment of the bracket according to the invention allows it to be adapted to varyingly wide telecommunication terminals, and to receive and reliably hold them regardless of their width.

If the telecommunication terminal has been inserted into the insertion opening far enough that the lower corners of its edge sides come into contact with the first sections of the receptacles on either side, the jaw can now be diverted transverse to the direction of insertion while continuing to insert the terminal. Where on the first section that this point is reached depends on the respective width of the inserted telecommunication terminal. During a continued insertion along the first section, the V-shape of the insertion opening is correspondingly opened. Insertion takes place against the restoring force of the second spring element, so that the receptacle here abuts against the corner of the edge side of the terminal.

If the telecommunication terminal has been inserted into the insertion opening far enough that the corners of the edge side of the terminal abutting on both sides in the receptacles have reached the position between the axes of rotation of the jaws, a continued insertion leads to the rotation of the jaws already described above. After the rotation, the telecommunication terminal can be inserted into the second sections of the receptacles of the respective jaws, which now run parallel to each other.

In an advantageous embodiment, the first and second spring elements are designed as a common spring element. This simplifies the construction. It is here especially advantageous that the common spring element be tensioned between the first and second jaws. In a spring element arranged in this manner, it is no longer necessary that each jaw be exposed to a separate spring element. A simple rubber band, preferably in the form of a silicone cord, has proven itself to be an especially suitable solution as the corresponding spring element. To protect against wear, this silicone cord is preferably sheathed in a cloth fabric. If the spring element is mounted to both jaws, so that rotating one or both of the jaws leads to a stretching of the spring element, pressing the two axes of rotation apart also causes a stretching of the spring element. If the jaws engage into the housing of the bracket with their axis of rotation, the spring element can run inside of the housing of the bracket. To this end, it must be mounted to the area of the axes of rotation of both jaws lying inside of the housing. In this way, the spring element is well protected against external influences.

In an especially preferred embodiment, the jaws each comprise an in particular cylindrical bolt, which runs along the axis of rotation of the respective jaw. The bolt is suitable in particular for controllably guiding the movement of the jaw. If the bolt engages into a guide provided in the housing, for example in the form of an oblong hole, this allows both the translatory motion of the jaw and its rotation relative to the housing. In addition, the common spring element can be mounted to the bolt. It is here preferably guided in a groove that circles around the circumference of the bolt and mounted thereto.

In the base position of the bracket, the first section of the receptacle of the rotatably mounted jaw is preferably arranged at a more obtuse angle relative to the first section of the receptacle of the opposing jaw than the second section of the jaw rotatably mounted to the housing relative to the second section of the receptacle of the opposing jaw. In the base position, the receptacles of the essentially V-shaped insertion opening thus spread apart more over the progression of the first sections than over the progression of the second sections of the receptacles.

As a result of this preferred configuration, the first sections still are spread apart from each other in the receiving position, when the two second sections are aligned at least approximately parallel to each other. A telecommunication terminal held in the receiving position is then non-positively held between the second sections of the receptacle, while a gap that becomes increasingly larger toward the upper end of the terminal opens between the edge sides of the telecommunication terminal and the first sections lying opposite them. This prevents the operating elements arranged on the edge side in the upper area of a telecommunication terminal, for example pushbuttons or rockers, from coming into contact with the first sections of the receptacles. A triggering of functions on the telecommunication terminal by the inadvertent activation of these operating elements is reliably prevented in this way. If the first sections were also to abut against the edge side, impacts conveyed by the bracket or quite simply the restoring force of the spring element might result in contact with the first sections of the receptacle causing an activation of these operating elements.

It is preferable that at least the second sections of the receptacles of the two jaws run along a straight line, and that the axis of rotation of the rotatably mounted jaw be arranged in the transition from the first to the second section of the receptacle in the basic position of the bracket. As a result of the straight progression of the second sections, the likewise straight edge side of a telecommunication terminal held in the receiving position can be held over the entire progression of the second section. This ensures a secure hold. In addition, a straight progression of the first sections facilitates the insertion of the telecommunication terminal into this area of the insertion opening. Due to the preferred arrangement of the axis of rotation, the transverse position of the jaw need not be adjusted as the jaw rotates.

In another preferred embodiment, the rotatably mounted jaw has a holding device, which blocks a continued rotation of the jaw and/or a spreading apart of the two jaws as soon as the jaw has been turned into a position in which its second section runs at least essentially parallel to the second section of the opposing jaw. Blockading the jaw arranged in the receiving position of the bracket protects the bracket against inadvertently opening, and thus potentially losing contact with the telecommunication terminal, for example as the result of impacts or vibrations. In an embodiment that is especially simple to realize, the holding device is mounted to the bolt that runs along the axis of rotation of the respective jaw.

The holding device is preferably a pin, which engages into a row of teeth that is fixedly connected with the housing and runs transverse to the insertion direction. The row of teeth makes it possible to block the jaw in any transverse position. For this purpose, the pin is arranged in such a way as to be guided by the rotation of the jaw against the row of teeth and engage into them. The pin is then supported against the next tooth in the row of teeth. If the jaw rotates back while moving the telecommunication terminal, the pin exits the row of teeth and lifts the blockade.

In a preferred embodiment, the rotatably mounted jaw has a supporting surface that is arranged in front of the axis of rotation in the direction of insertion, wherein the supporting surface rests on an area of an upper edge of the housing arranged in front of the axis of rotation in the direction of insertion, wherein the area runs essentially transverse to the direction of insertion and parallel to the axis of rotation. This prevents a rotation of the jaw away from the telecommunication terminal, which is initiated by the torque that arises while inserting the telecommunication terminal into the insertion opening due to its contact with the first sections.

It is also advantageous that the floor of the first and second receptacle at least essentially be U-shaped in design, so that the edge sides of the telecommunication terminal inserted therein are undercut on both sides, wherein the distance between the two legs in particular diminishes toward the floor of the U. By virtue of the positive form closure with the front and back sides of the terminal or its sheath, the U-shaped design of the receptacles prevents a terminal inserted into the latter from being able to fall out of the receptacle toward the front or back.

The narrowing distance between the legs of the U allows the receptacle to also securely hold telecommunication terminals of varying thickness, or those with protective sheaths of varying thickness. Inserting the telecommunication terminal or its sheath that covers the edge side into the receptacle results in contact between the receptacle and the lower corner region of the edge side of the telecommunication terminal. The thickness of the terminal determines the possible penetration depth into the receptacle. If the terminal has been inserted into a protective sheath or a frame that protects the edge side of the terminal and its edges at least in this corner region, the sheath or frame is grasped according to the same principle. In this way, the terminal or its sheath can be inserted into the receptacle to a point where it abuts against the legs of the U on both sides, i.e., is held without any clearance.

It is also advantageous that the leg of the receptacle lying closer to the housing of the bracket have a flap, which protrudes in the receptacle and is pressed in the direction of the housing of the bracket while inserting the telecommunication terminal into the receptacle. This flap is arranged in such a way that it comes to lie with its end face below an edge of the housing in the receiving position. With the telecommunication terminal pressed to the outside, the end face hitches onto this edge from behind. This is an additional safeguard against the inadvertent twisting of the jaw.

The bracket according to the invention will be described in more detail below based upon a preferred embodiment. Shown here are.

BRIEF DESCRIPTION OF THE SEVERAL VIEWS OF THE DRAWING

DETAILED DESCRIPTION OF THE INVENTION

Figure 1:
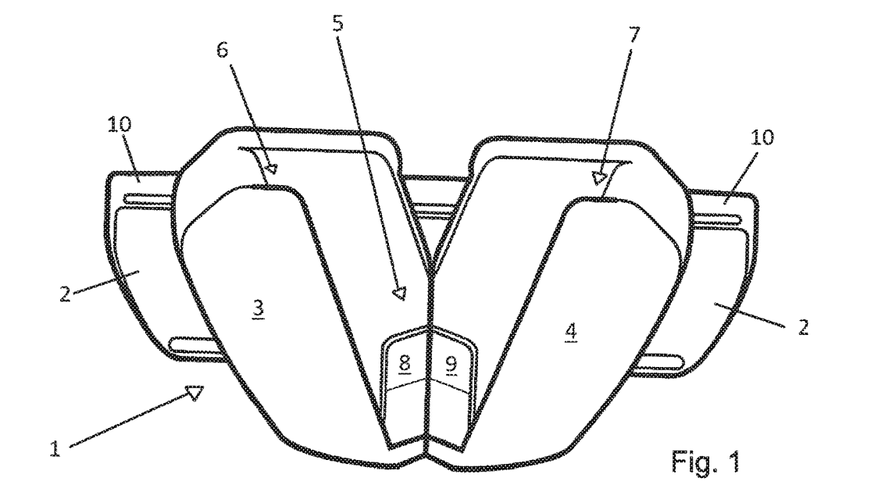
FIG. 1: An illustration of a bracket according to the invention in the initial position.

The bracket 1 shown in its initial position comprises a housing 2, with which it can be mounted to the handle of a shopping cart not depicted here, for example. A first jaw 3 and a second jaw 4 having an axially symmetrical shape protrude on the housing 2. They are rotatably and movably held on the housing 2. The jaws 3, 4 abut against each other, and are held together by a preloaded spring element (not shown here). They together form an at least essentially V-shaped insertion opening 5 for a telecommunication terminal (not shown here). The first 3 or second 4 jaw has an at least essentially U-shaped first receptacle 6 or second receptacle 7, which comprise the lateral boundary of the at least essentially V-shaped insertion opening 5. A flap 8, 9 whose function will be described later is formed in the lower area of the insertion opening 5 on each jaw 3, 4.

Figure 2:
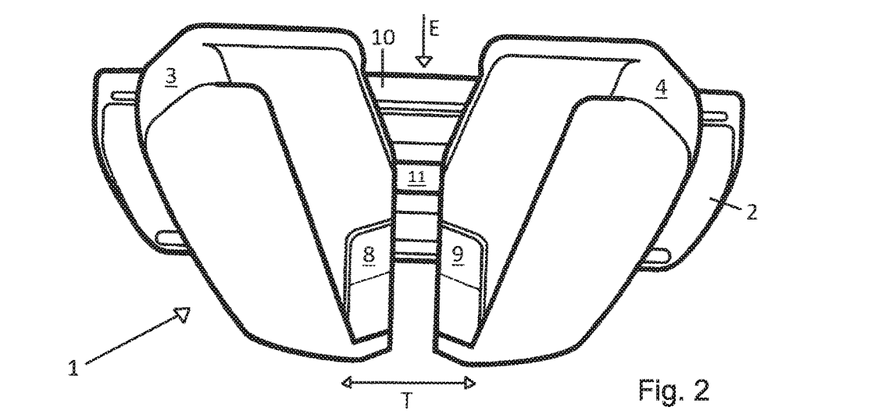
FIG. 2: The bracket according to FIG. 1 with jaws shifted transverse to the direction of insertion.

FIG. 2 shows the jaws 3, 4 in a position in which they were displaced transverse to a direction of insertion E of the telecommunication terminal. The transverse displacement T is caused by inserting the telecommunication terminal (not shown here) into the insertion opening 5. As soon as the lateral edges of the telecommunication terminal come into contact with the first sections 6a, 7a of the receptacles 6, 7 and pressure is exerted on the latter while continuing to insert the terminal, the jaws 3, 4 are pushed away. A supporting surface (not visible here) of each jaw 3, 4 rests on the upper lateral edge 10 of the housing 2, and prevents a respective outward rotation of the jaws 3, 4 caused by the induced torque. Therefore, the jaws 3, 4 can only be transversely diverted. The transverse displacement T of the jaws 3, 4 is prescribed by an oblong hole 11, which runs in the housing 2, and in which the axes of rotation of the jaws 3, 4 can be displaced.

During the insertion of the telecommunication terminal or the sheath which holds the terminal, its corner areas slide along the first section 6a or the first section 7a of the two receptacles 6, 7. In the process, the corner areas press against the first sections 6a, 7a, thereby causing the transverse displacement T of the jaws 3, 4. The accompanying expansion of the insertion opening 5 allows the telecommunication terminal to penetrate further into the insertion opening 5. If the areas have penetrated to a point where they are arranged between the axis of rotation of the jaws 3, 4, no continued transverse displacement T of the jaws 3, 4 takes places. Instead, the jaws 3, 4 rotate into the holding position shown on FIG. 3.

In the holding position, the jaws 3, 4 have been turned to such an extent that the second sections 6b, 7b of their receptacles 6, 7 run at least essentially parallel to each other. This position of the second section 6b is shown in the partial section of the receptacle 6 of the first jaw 3 visible on FIG. 3. Since the first section 6a runs at a more obtuse angle relative to the first section 7*a* than the second section 6*b* relative to the second section 7*b* in the initial position, this results in the first section 6*a* running at a slight outward angle by comparison to the second section 6*b* in the receiving position. The same holds true for the first 7*a* and second 7*b* sections of the receptacle 7 of the jaw 4, which are here only shown covered. As a result, a telecommunication terminal held in the receiving position is held between the second sections 6*b*, 7*b*, while a gap that becomes increasingly larger toward the top forms between the first sections 6*a*, 7*a* and the edge side of the telecommunication terminal in the area of the first sections 6*a*, 7*a*.

Figure 3:
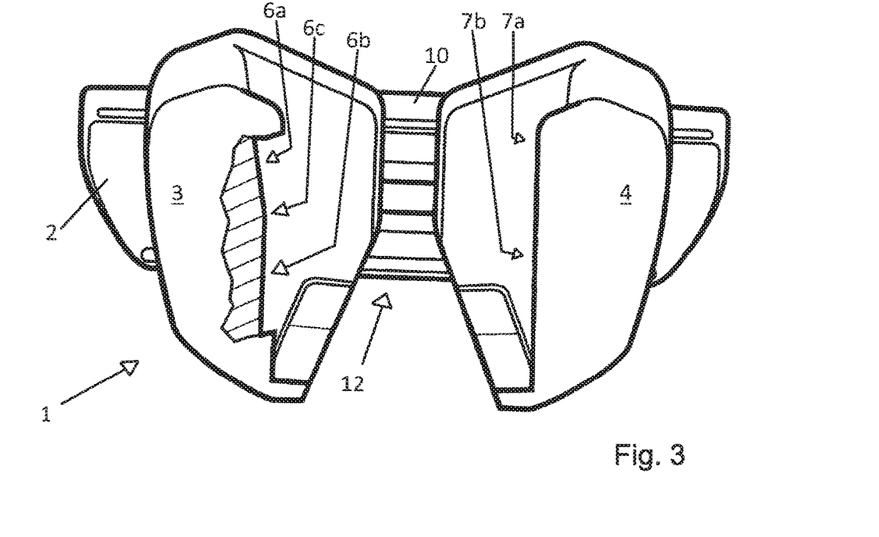
FIG. 3: The inventive bracket according to FIGS. 1 and 2 in its receiving position.

It is advantageous that a transition 6*c* lie between the first and second sections 6*a*, 6*b* on the axis of rotation, so that no adjustment of the position in a transverse direction must take place given a rotation by the jaw 3. The same naturally applies to the receptacle of the jaw 4 too.

In the receiving position, the flaps 8, 9 come to rest on the lower side 12 of the housing 2 with their end face, as long as they are outwardly pressed by the telecommunication terminal inserted into the receptacle. In this way, they form a twisting safeguard for the jaws 3, 4, which by comparison to the holding device acts in the opposite direction of rotation.

It is especially advantageous that the second sections 6*b*, 7*b* comprise a stop for the terminal at their end opposite the first sections 6*a*, 7*a*, so that it cannot be inserted further or slide out.

The bracket according to the invention can be mounted in various ways to a pipe, in particular to a tubular grip of a shopping cart. However, the preferred mounting discussed below is not only suitable for the bracket, but can independently thereof also be used for the tilt-proof mounting of any object to a pipe, in particular to a tubular shopping cart handle.

Figure 4:
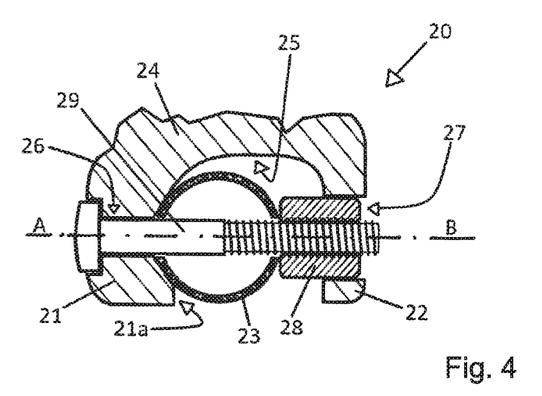
FIG. 4: A sectional view of the attachment of the mounting extension.
Figure 5:
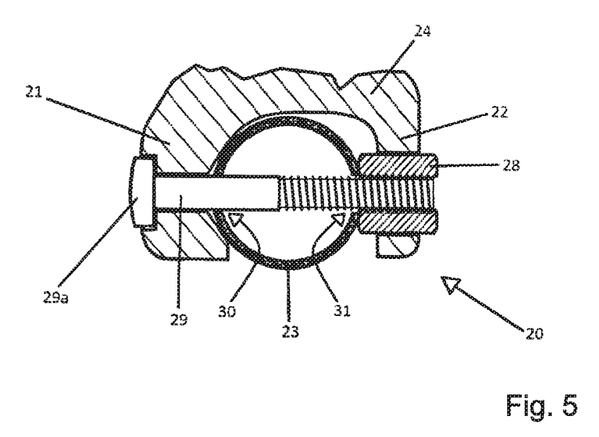
FIG. 5: A sectional view, similar to FIG. 4, with a slightly larger diameter of the attachment pipe.

This type of mounting extension 20 shown on FIGS. 4 and 5 can be connected with the housing of the bracket or whatever object desired, or be integrally designed with it. It has two legs 21, 22 that partially envelop the pipe 23. The two legs 21, 22 are connected with each other via a floor 24, so that the mounting extension has an at least approximately U-shaped progression on its interior side 25 facing the pipe 23. The floor 24 has a graphically depicted breaking edge. The section of the mounting extension 20 adjacent to this breaking edge (not shown here) has means for mounting the bracket or whatever object desired.

The first leg 21 preferably has a thicker design, and comprises a first borehole 26 that is aligned transverse to the first leg, and runs from the exterior side of the first leg to its interior side. The second leg 22 opposing it has an opening 27 in an extension of the axis A of the first borehole 26.

The interior side of the first leg 21 has a concave design, so that the end area 21*a* of the first leg 21 forms an undercut for a circular arc section of a pipe 21 inserted into the U-shaped opening of the mounting extension 20 that abuts against the first leg 21.

The opening 27 that runs through the second leg 22 has a polygonal design. As a consequence, it can positively hold an outer profile of a slightly smaller nut 28 inserted into the opening 27 and secure it against twisting. In a preferred embodiment, the nut 28 is a square nut. The outer profile of a square nut offers enough of a working surface for non-rotatable retention.

The nut 28 inserted into the opening 27 can be moved in the longitudinal direction of the opening 27. In this way, a screw 29 can be inserted into the first borehole and into the pipe 23 via a second borehole 30, and removed from the pipe 23 again via a third, opposing borehole 31, i.e., lying 180 degrees opposite the second borehole 30 and introduced into the nut 28.

By tightening the screw 29 in the nut 28, the nut 28 displaceably held in the opening 27 of the second leg 22 makes it possible to clamp pipes 23 with varying diameters to the first leg. Held in this way, the mounting extension 20 is mounted to the pipe 23 in a tilt-proof manner. The material thickness of the first leg 21 is elevated by comparison to the second leg 22, which prevents the first leg 21 from bending, thereby helping to securely hold the mounting extension 20. Configured in this way, the mounting extension 20 can be made out of plastic, as already the case with the housing and the jaws of the bracket.

By contrast, the second leg 22 only has to hold the nut 28 secured against rotation, and can be correspondingly weaker in design. Since its interior side usually does not come into contact with the pipe 23, it is also not necessary to make the latter concave in design. It is here enough that the second leg 22 have a simpler design in terms of production technology, in particular that it run along a straight line.

The first borehole 26 in the first leg 21 as well as the second 30 and third 31 borehole in the pipe 23 are dimensionally tailored to the threaded screw 29, and preferably have the same diameter. This ensures that the fit of the mounting extension 20 on the pipe will be as free of play and tight as possible.

The angle at which the mounting extension 20 is held on the pipe 23 determines the alignment of axis B, which runs through the second 30 and third 31 borehole provided in the pipe 23.

Therefore, in order to mount the mounting extension 20 to the pipe 23, it is only necessary to place the mounting extension 20 on the pipe 23, equally align axis A and axis B, introduce the screw into the borehole 26 and then into the boreholes 30 and 31 until the screw head 29*a* abuts against the first leg 21. Finally, just the thread of the screw 26 has to be screwed into the opening 27 of the nut 28 inserted on the second leg 22 until the pipe is clamped to the first leg 21. FIGS. 4 and 5 only differ with respect to the diameter of the pipe 23, and the resultant position of the nut 28 in the opening 27.

Figure 6:
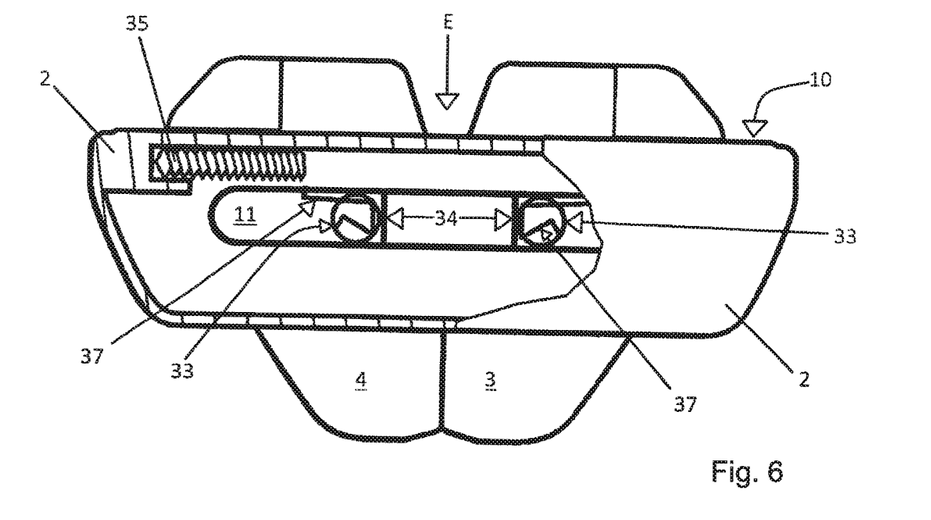
FIG. 6: A rear view of the bracket in the position according to FIG. 1 with partially opened housing.
Figure 7:
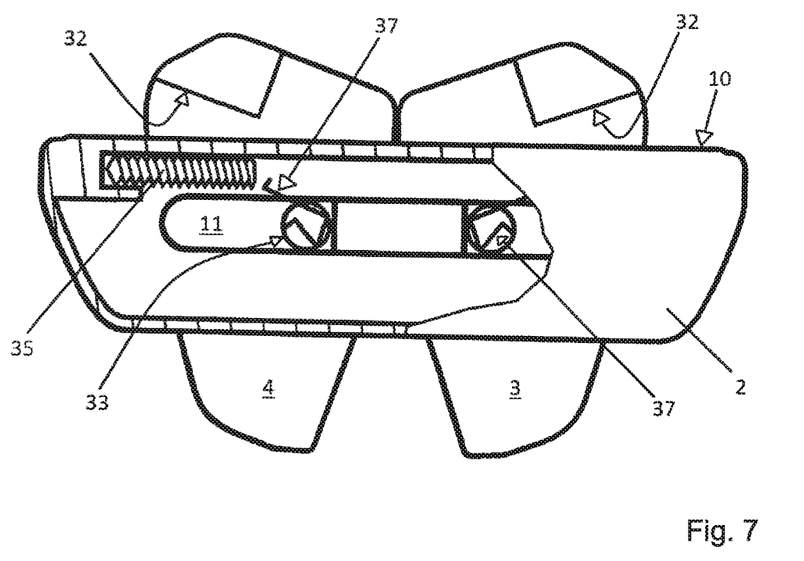
FIG. 7: A rear view of the bracket according to FIG. 4 with twisted jaws.

FIG. 6 shows the back side of a bracket in a position corresponding to the bracket on FIG. 1. FIG. 7 shows the back view of the bracket according to FIG. 4 with a twisted jaw, and FIG. 8 the back view of the bracket in the position according to FIG. 3. To better explain the features, the mounting extension depicted on FIGS. 4 and 5 is not shown on these figures, and a partial section additionally opens up a partial area of the housing 2. The bracket according to FIGS. 6-8 can otherwise have the same features as the described embodiments of the brackets according to FIGS. 1-3.

Figure 8:
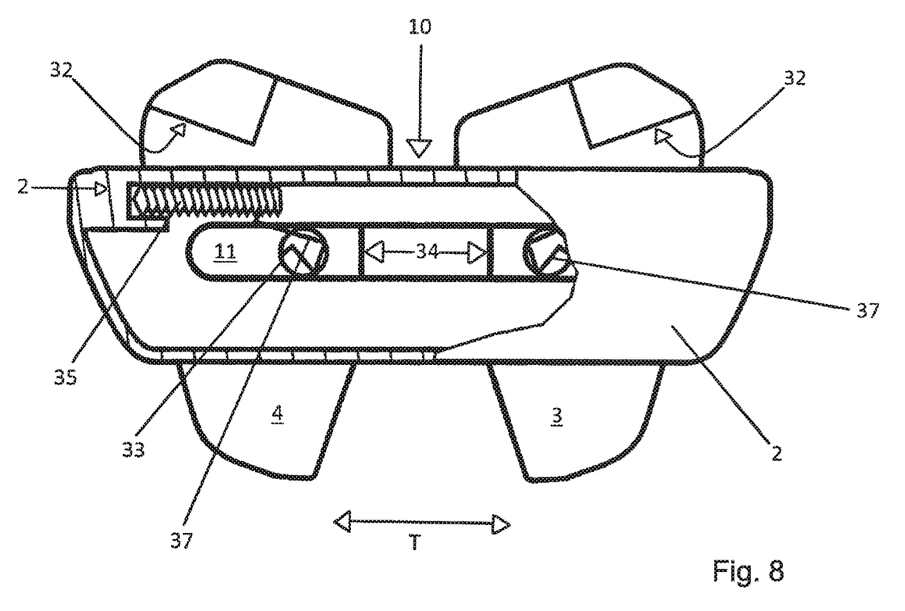
FIG. 8: A rear view of the bracket in the position according to FIG. 3 with partially opened housing.

Readily visible in particular on FIGS. 7 and 8 is a supporting surface 32 of the jaws 3, 4, which in the receiving position rests on the upper edge 10 of the housing 2, and thereby prevents the respective jaw 3, 4 from rotating away from the telecommunication terminal.

Each jaw 3, 4 has a bolt 33 running along its axis of rotation, which is guided into the oblong hole 11 of the housing 2. On the one hand, this guide makes it possible to move the jaws 3, 4 transverse to the direction of insertion E, i.e., at a right angle thereto. In addition, it also allows the jaws 3, 4 to rotate along their axis of rotation, in particular if the axis of rotation of the jaws 3, 4 and the bolt 33 coincide. The oblong hole 11 advantageously has a stop 34 for each bolt that prevents a compression of the jaws 3, 4.

Pressed into the housing 2 is a threaded pin 35, which is aligned parallel to the transverse direction T. In an embodiment particularly suited for this purpose, the receptacle 36 of the housing 2 provided for the press-in operation is circumferentially designed in such a way as to circle around more than 200 degrees of the threaded pin 35.

Rotating the jaw 3, 4 in the receiving position shown on FIG. 8 causes a third spring element 37 held on the bolt 33 to engage into the threaded pin 35 and blocks the respective jaw 3, 4 from continuing to rotate beyond the receiving position. The advantage to the third spring element 37 is that it bends while engaging into the detent of the threaded pin 35, and in this way allows the jaw 3, 4 to turn back a little again without the third spring element 37 losing contact with the detent. It is here advantageous that the third spring element 37 and the detent of the threaded pin 35 be tailored to each other in such a way that the spring element 37 remains in the detent for as long as the jaw 3, 4 is being turned by 3-4 degrees. This makes it possible to offset any play between the jaws 3, 4 and the terminal or a backward turning force acting on the jaws 3, 4. For example, the third spring element 37 can be designed as a metal strip.

As long as the third spring element 37 remains in the detent, it blocks the continued lateral displacement of the jaw 3, 4. Given an exposure to a force that exceeds the normal use of the bracket, the increased bending causes the spring element 37 to latch out of the detent of the threaded pin 35 and into the next detent. The third spring element 37 thus acts as an overload protector. Given an excessively strong translational force, for example an attempt at willful damage, the third spring element 37 is pressed out of the detent and releases the respective jaw 3, 4.

It is especially advantageous that the threaded pin 35 be so short that the third spring element 37 cannot engage into it in the initial position of the bracket. This allows the respective jaw 3, 4 to rotate as shown on FIG. 7.

Figure 9:
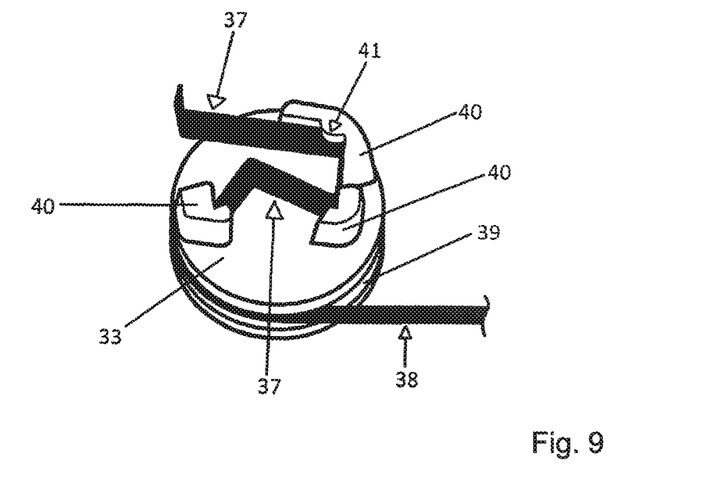
FIG. 9: A perspective drawing of a bolt of a jaw with common and third spring elements.

FIG. 9 shows a perspective view of the bolt 33. The common spring element 38 circles around the circumference of the bolt 33 by preferably more than 180 degrees, in particular by 270 degrees, and is knotted to the latter. It preferably circles around the bolt 33 along a groove 39 formed on the bolt 33.

It is advantageous that the bolt 33 have a fastener 40 for the third spring element 37, which is preferably formed on its head side. The fastener 40 is preferably designed as a three-point fastener, of which at least one of the receptacles has a canopy 41 that prevents the third spring element 37 from jumping out.

The invention claimed is:

1. A bracket for a telecommunication terminal, the bracket comprising:
 a housing and two jaws mounted to said housing;
 said two jaws including a first jaw formed with a first receptacle for a first edge side of the telecommunication terminal, and a second jaw formed with a second receptacle for a second edge side of the telecommunication terminal opposite the first edge side;
 said first and second receptacles, in an initial position of the bracket, defining respective sides of an at least substantially V-shaped insertion opening for the telecommunication terminal;
 at least one of said first and second jaws being rotatably mounted to said housing about an axis or rotation;
 said receptacle of said rotatably mounted jaw having two sections, including a first section arranged in front of the axis of rotation in a direction of insertion of the telecommunication terminal, and a second section arranged behind the axis of rotation in the direction of insertion of the telecommunication terminal; and
 a first spring element disposed to provide a restoring force counter to a rotation of said rotatably mounted jaw.

2. The bracket according to claim 1, wherein the axis of rotation of said rotatably mounted jaw is movable transversely to the direction of insertion of the telecommunication terminal and against a restoring force of a second spring element.

3. The bracket according to claim 1, wherein said first and second spring elements are a common spring element.

4. The bracket according to claim 3, wherein said common spring element is tensioned between said first and second jaws.

5. The bracket according to claim 4, wherein said common spring element is tensioned between respective axes of rotation of said first and second jaws.

6. The bracket according to claim 4, wherein said common spring element is tensioned between two bolts of said jaws.

7. The bracket according to claim 6, wherein said common spring element is guided on the bolt along a groove encircling the respective said bolt.

8. The bracket according to claim 1, wherein, in the initial position of the bracket, said first section of said receptacle of said rotatably mounted jaw is arranged at a more obtuse angle relative to said first section of said receptacle of the opposing said jaw than said second section of said jaw rotatably mounted to said housing relative to said second section of said receptacle of the opposing said jaw.

9. The bracket according to claim 1, wherein said second sections of said receptacles of said two jaws run along a straight line, and said axis of rotation of said rotatably mounted jaw is arranged at a transition from said first section to said second section of said receptacle in the initial position of the bracket.

10. The bracket according to claim 9, further comprising a holding device configured to block a continued rotation of said rotatably mounted jaw and/or a spreading apart of said two jaws as soon as the jaw has been turned into a position in which said second section runs substantially parallel to said second section of the opposing said jaw.

11. The bracket according to claim 10, wherein said holding device is a pin or a third spring element, which engages into a row of teeth that is fixedly connected with the housing and runs transverse to the direction of insertion.

12. The bracket according to claim 11, wherein the row of teeth are formed on a threaded pin.

13. The bracket according to claim 11, wherein said holding device is mounted to a bolt of said jaw extending along the axis of rotation of said jaw.

14. The bracket according to claim 1, wherein said rotatably mounted jaw has a supporting surface in front of the axis of rotation in the direction of insertion, the supporting surface rests on an area of an upper side of said housing arranged in front of the axis of rotation in the direction of insertion, and the area extends transversely to the direction of insertion and parallel to the axis of rotation.

15. The bracket according to claim 1, wherein each of said first and second receptacles is formed with a substantially U-shaped floor, so that the edge sides of the telecommunication terminal inserted therein are undercut on both sides, and wherein a distance between two legs of the U-shape diminish toward a base of the U-shaped floor.

16. A method for inserting a telecommunication terminal into a holding bracket, the method comprising:

providing a bracket with two jaws, each of the jaws having a receptacle for an edge side of the telecommunication terminal, and each receptacle forming a side of a V-shaped insertion opening in an initial position of the bracket;

initially inserting the telecommunication terminal into the insertion opening in a first step, so that opposing edge sides of the telecommunication terminal come to abut against a respective one of the receptacles;

additionally inserting the telecommunication terminal along a first section of the receptacles to displace at least one of the jaws transversely to the direction of insertion; and inserting the opposing edge sides into a second section of the receptacles in a second step, wherein the second sections are arranged parallel to each other once the second sections have been reached.

\* \* \* \* \*